United States Patent [19]

Sobey et al.

[11] Patent Number: 5,457,707

[45] Date of Patent: Oct. 10, 1995

[54] MASTER OPTICAL PARAMETRIC OSCILLATOR/POWER OPTICAL PARAMETRIC OSCILLATOR

[75] Inventors: Mark S. Sobey, San Carlos; James B. Clark, Campbell; Vincent J. Newell, Pleasanton, all of Calif.

[73] Assignee: Spectra-Physics Lasers, Inc., Mountain View, Calif.

[21] Appl. No.: 111,083

[22] Filed: Aug. 24, 1993

[51] Int. Cl.$^6$ ............ H03F 7/00; H01S 3/23; H01S 3/082; H01S 3/10
[52] U.S. Cl. ............ 372/20; 372/21; 372/22; 372/97; 372/68; 372/95; 372/70; 359/330
[58] Field of Search ............ 372/20, 21, 22, 372/32, 70, 71, 25, 97, 68; 359/330, 342, 345, 328

[56] References Cited

U.S. PATENT DOCUMENTS

| | | | |
|---|---|---|---|
| 4,349,907 | 10/1982 | Campillo et al. | 372/92 |
| 4,360,925 | 11/1982 | Brosnan et al. | 372/95 |
| 4,717,842 | 1/1988 | Komine | 372/95 |
| 5,033,057 | 7/1991 | Bosenberg et al. | 372/72 |
| 5,053,641 | 10/1991 | Cheng et al. | 359/330 |
| 5,117,126 | 5/1992 | Geiger | 359/330 |

FOREIGN PATENT DOCUMENTS 0258088  10/1988  Japan ............ 372/20

OTHER PUBLICATIONS

Brosnan et al., "Optical Parametric Ocillator and Linewidth Studies", IEEE Journal of Quantum Electronics, vol. QE–15, No. 6, Jun. 1979.
Ebbers, "Linear electro–optic effect in β–BaB$_2$O$_4$", Appl. Phys. Lett. 52(23), 6 Jun. 1988, pp. 1948–1949.
Eimerl, et al., "Optical, mechanical and thermal properties of barium borate", J. Appl. Phys. 62(5), 1 Sep. 1987, pp. 1968–1983.

Primary Examiner—Rodney B. Bovernick
Assistant Examiner—Robert McNutt
Attorney, Agent, or Firm—Haynes & Davis

[57] ABSTRACT

A tunable laser system having a wide tunable range, and narrow line widths, achieves relatively high output powers. The tunable laser system includes a master optical parametric oscillator which generates a seed beam, and a power optical parametric oscillator which is responsive to the seed beam to generate a narrow line width, high power output beam. The master OPO and power OPO comprise gain media consisting of BBO, tunable over a range from about 400 nanometers to more than 2000 nanometers. The master OPO includes line narrowing elements, such as a tunable grating, which limits the line width of the output beam to less than one wave number (centimeter$^{-1}$). Pump energy is supplied to the master OPO and power OPO using a Nd:YAG laser with a harmonic generator, so that the second, third, or fourth harmonics of the primary 1064 nanometer line of YAG can be used to pump the BBO crystals. The power OPO may be an unstable resonator.

38 Claims, 3 Drawing Sheets

MASTER OPTICAL PARAMETRIC OSCILLATOR/POWER OPTICAL PARAMETRIC OSCILLATOR

CROSS-REFERENCE TO RELATED APPLICATION

The present application is related to U.S. patent application entitled OPTICAL PARAMETRIC OSCILLATOR WITH UNSTABLE RESONATOR, Ser. No. 08/111,082, filed on the same day as the present application now U.S. Pat. No. 5,390,211, and invented by Clark, et al. This related application was owned at the time of invention and is currently owned by the same assignee as the present application.

BACKGROUND OF THE INVENTION

1. Field of the Invention

The present invention relates to tunable laser systems, and more particularly to relatively high energy tunable systems with narrow line widths.

2. Description of Related Art

Tunable laser systems with relatively high output energies and narrow line widths have a number of scientific and engineering applications. Most such systems are implemented using dye lasers which are based on gain media dyes, each of which are tunable over a range of 15–100 nanometers. These systems are desirable because of the narrow line widths and relatively high energy that is achievable. However, dye laser systems are cumbersome for applications requiring a wide tunable range, because the dye gain medium must be changed as the output is tuned beyond the 15 or 100 nanometer range of the particular dye being used.

Optical parametric oscillators and amplifiers provide another technique for providing a tunable system. OPOs are particularly interesting because of the wide range of tunability which can be achieved using the same. For instance, OPOs using β-barium borate (BBO) as the optical gain material have achieved tunable ranges from less than 400 nanometers to over about 2500 nanometers. These systems are tunable by rotating the angle of the crystal relative to the optical path using servo techniques well known in the art.

Master oscillator/power oscillator designs based on injection seeding have been applied to BBO based OPO designs. However, the outputs of such systems have relatively broad band output pulses of greater than 1 $cm^{-1}$, with energies of up to 50 mJ per pulse. However, no higher energy and narrower line width systems have been achieved. For instance, power oscillator OPO cavities injection seeded with narrow band laser sources, such as laser diodes or dye lasers, have been implemented. Resulting output of these systems is relatively high energy and narrow line. However, laser diode or dye laser type injection seeded OPOs have not been of any commercial value because of the severe limitations in tuning the diodes of ±5 nanometers, or of the dyes of ±50 nanometers. Dye based laser systems also lose the desired elegance of all solid state systems, since the liquid dyes themselves degrade and are consumable.

Prior art OPO systems, however, have been unable to achieve narrow line widths in combination with broad tunability and with sufficiently high power for commercial application. Thus, it is desirable to provide a broadly tunable system supplying laser light with relatively high energy and narrow line width outputs.

SUMMARY OF THE INVENTION

The present invention provides a tunable laser system having a wide tunable range, and narrow line widths, while achieving relatively high output energy. The tunable laser system comprises a master optical parametric oscillator which generates a seed beam, and a power optical parametric oscillator which is responsive to the seed beam and narrow line width pump energy to generate a narrow line width, high energy output beam.

According to one aspect of the invention, the master OPO and power OPO comprise gain media consisting of BBO, tunable over a range from the visible range to more than 2000 nanometers. The master OPO includes line narrowing elements, such as a tunable grating optimized for the visible range, which limits the line width of the output beam to less than one wave number ($cm^{-1}$).

According to another aspect of the invention, pump energy is supplied to the master OPO and power OPO using a Nd:YAG laser with a line narrowing diode pumped solid state injection seeding laser and a harmonic generator, so that the narrow bandwidth second, third, or fourth harmonics of the primary 1064 nanometer line of Nd:YAG can be used to pump the BBO crystals.

The master OPO with line narrowing elements/power OPO system of the present invention has been shown to produce narrow line widths (less than 0.2 $cm^{-1}$ down to essentially a single longitudinal mode), high energy (from greater than 25 mJ to over 100 mJ per pulse), and outputs tunable over a range from about 400 nanometers to over 2500 nanometers.

The master OPO produces narrow line width, low energy seed pulses to injection seed the power OPO. This, in combination with the narrow band Nd:YAG pump laser, produces high energy output pulses at a line width similar to that generated by the master OPO. The master OPO and power OPO can be tuned cooperatively over the entire range. Further, the power OPO may be implemented with a positive branch, confocal unstable resonator to produce a high quality, low divergence output.

Accordingly, the present invention provides a narrow line width, high energy QPO design utilizing the broad tunability of BBQ in an all solid state device. Such devices will have great value in many scientific, engineering, and medical applications.

Other aspects and advantages of the present invention can be seen upon review of the figures, the detailed description, and the claims which follow.

DESCRIPTION OF THE PREFERRED EMBODIMENTS

A detailed description of a preferred embodiment of the present invention is provided with respect to the figures.

Figure 1:
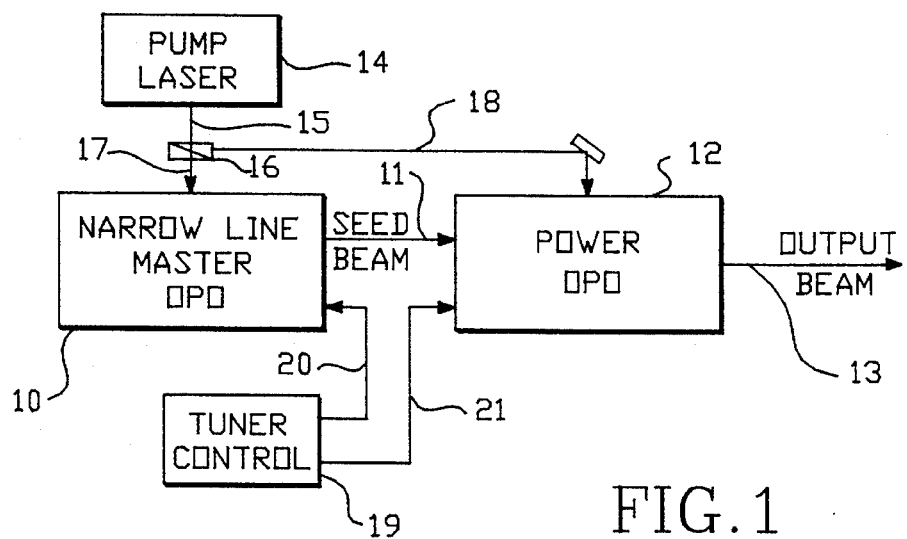
FIG. 1 is a schematic block diagram of a tunable laser system according to the present invention.

FIG. 1 illustrates the basic tunable laser system according to the present invention. The laser system includes a master narrow line OPO 10 which generates a relatively low energy, narrow line width seed beam on line 11. The seed beam is supplied to injection seed a power OPO 12. Power OPO 12 generates a relatively high energy, narrow line width output beam 13.

A single mode laser source 14 generates a pump beam on line 15 which is supplied to a beam splitter 16 or other beam guiding optics along a first path 17 to pump the master OPO 10, and along a second path 18 to pump the power OPO 12.

The master and power OPOs 10, 12 include gain media on angle tunable mounts according to techniques well known in the art. These mounts are coupled to tuner control 19 across lines 20 and 21, respectively, which cooperatively tune the master OPO and power OPO to generate the output beam 13 at a selected wavelength.

Figure 2:
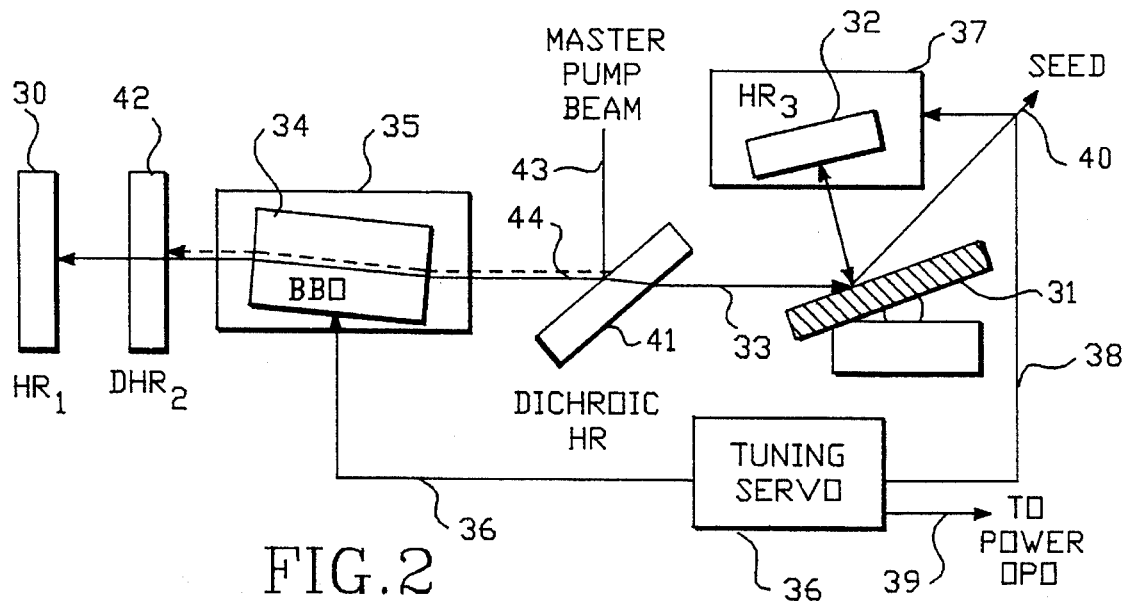
FIG. 2 is a schematic diagram of a narrow line master OPO for use in the system of FIG. 1.

FIG. 2 illustrates a preferred configuration of the narrow line master OPO 10 for use in the system of FIG. 1. The master OPO consists of a resonant oscillator OPO cavity defined by high reflector HR$_1$30, diffraction grating 31, and high reflector HR$_3$32. This resonant oscillator OPO cavity defines an optical path 33 through a gain material 34. The gain material comprises a non-centrosymmetric crystal having a non-linear polarizability, wide optical transmission, and a large non-linear coefficient, such as β-barium borate. The gain material 34 is mounted on an angle tunable mount 35 using techniques well known in the art.

The master OPO is coupled to a tuning servo 36 which tunes the resonant oscillator OPO cavity by rotating the gain material 34 to adjust the phase match angle within the gain material 34, and to rotate the mirror HR$_3$32 to keep reflection onto the grating at the correct angle to match the changes in wavelength. Thus, the tuning servo is coupled to the angle tunable mount 35 across line 36, and coupled to a controllable mount 37 for the high reflector HR$_3$32 across line 38. The tuning servo 36 is also coupled across line 39 to the power OPO as described in FIG. 3.

The master OPO in FIG. 2 includes structure for longitudinally pumping the BBO material 34. This structure includes a dichroic mirror 41 and dichroic high reflector DHR$_2$42. A master pump beam is supplied along path 43 into dichroic mirror 41 and reflected through the gain material along path 44 to reflector 42 for a second pass through the gain material 34.

The high reflectors HR$_1$30 and HR$_3$32 are broad band visible high reflectors.

The dichroic high reflector 41 is reflective at the pump wavelength at 45° and transmits through the tunable range of the gain material 34. Similarly, high reflector 42 is reflective at the pump beam wavelength at 0°, and transmissive over the tunable range of the gain material 34. High reflector 42 may be configured for 45° to direct the pump beam out of the resonant path after a single pass through the gain medium.

In the preferred system, the master pump beam 43 is supplied by a pulsed Nd:YAG, single mode laser system with a harmonic generator (such as the GCR-4(10) injection seeded systems available from Spectra-Physics Lasers, Inc., of Mountain View, California) for supplying the third harmonic output at approximately 355 nanometers. Thus, the reflectors 41 and 42 are reflective at 355 nanometers. The β-barium borate a gain material 34 has a tunable range from about 400 nanometers to over 2500 nanometers. Thus, the reflectors 41 and 42 are transmissive from about 400 to over 2500 nanometers.

The grating 31 in a preferred system has 2700 lines (or grooves) per millimeter, optimized for a signal beam range of 400 to 700 nanometers.

The grating 31 is a wavelength selective element which provides for controlling the line width of the seed beam 40 to less than one wave number, and preferably less than 0.2 cm$^{-1}$. Furthermore, this system can control the line width to less than 0.05 cm$^{-1}$ without requiring the use of etalons. Systems without etalons are not limited by the wavelength selective coatings used in etalons, which require multiple optics to cover the tunable range of the OPO.

Figure 3:
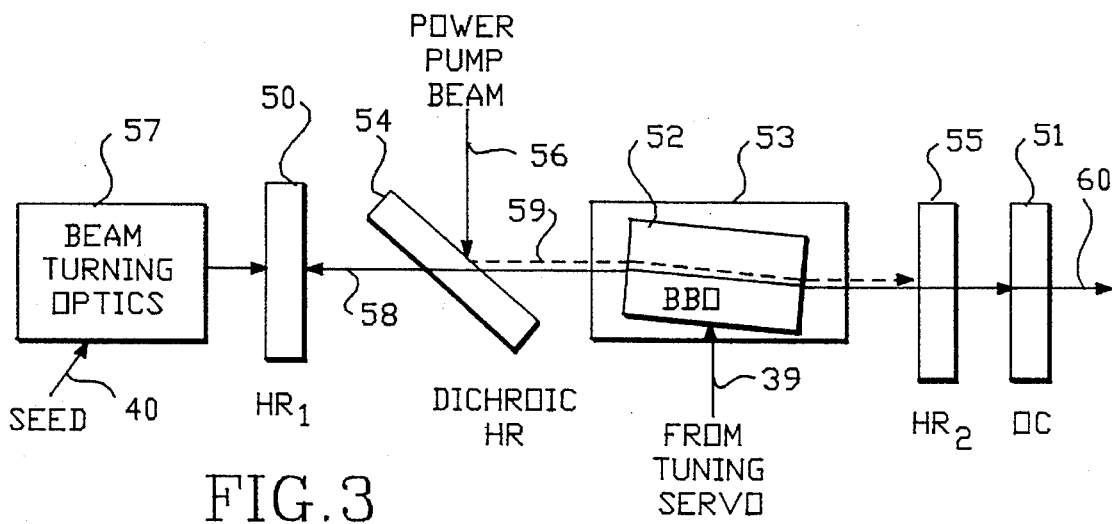
FIG. 3 is a schematic diagram of a power OPO for use in the system of FIG. 1.

FIG. 3 illustrates the configuration of the power OPO for use in the system of FIG. 1. The power OPO includes a resonant oscillator OPO cavity consisting of high reflector HR$_1$50, and output coupler OC 51. The gain material 52 consists of β-barium borate in the preferred system, and otherwise matches the gain material provided in the master QPO of FIG. 2. The output coupler 51 is about 15% transmissive over the range of about 400 to 2500 nanometers.

The gain material 52 is mounted on an angle tunable mount 53 which is controlled across line 39 by the tuning servo 36 shown in FIG. 2. The angle tunable mount 53 is cooperatively tuned with the angle tunable mount 35 of FIG. 2 by the tuning servo 36 to keep the phase match angles equal for the gain material.

This resonant oscillator OPO cavity also includes a structure for longitudinally pumping the gain material 52 based on dichroic high reflector 54 and dichroic high reflector HR$_2$55 configured for a double pass through the gain medium. As mentioned above, the high reflector 55 may be set at 45° to provide for a single pass of the pump beam through the gain medium.

A pump beam is supplied on path 56 into the dichroic high reflector 54 which reflects the beam on path 59 through the gain material 52 to high reflector 55. The pump beam is then pumped for a second pass through the gain material 52 by the high reflector HR$_2$55. The pump beam 56 for the power OPO is again preferably the 355 third harmonic of a pulsed Nd:YAG, single mode laser system.

The seed beam 40 from the master OPO, as shown in FIG. 2, is supplied through appropriate beam routing optics 57 through high reflector HR$_1$50 into the BBO material 52 along the optical path 58. This results in generation of a high energy, narrow line width output beam along path 60.

In the preferred system, master OPO generates a relatively low energy pulse of less than about 20 mJ per pulse, for example about 1–5 mJ, with a narrow line width of less than 0.2 cm$^{-1}$ with a signal beam tunable over a range of 400 to 700 nanometers and an idler beam simultaneously non-resonantly generated from 2000 to 700 nanometers.

The power OPO generates relatively high energy output pulses of greater than 25 mJ per pulse, for example 50 mJ per pulse, up to over 100 mJ per pulse with a narrow line width of substantially the same as that generated by the master OPO. The gain material 52 is tunable over a range of 400 to over 2000 nanometers.

Figure 4:
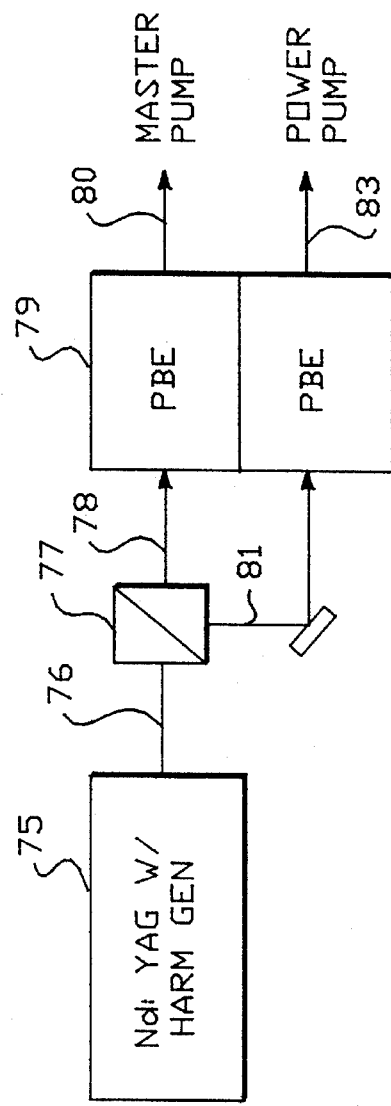
FIG. 4 is a schematic diagram of a pump laser for use in the system of FIG. 1.

FIG. 4 illustrates a preferred implementation of the pump laser 14 of FIG. 1. In this system, the pump energy is supplied by a pulsed, single mode Nd:YAG laser system with a harmonic generator, generally 75. The third harmonic output of the laser system 75 is supplied on path 76 to beam splitter 77. The beam splitter generates an output along path 78 through a prism beam expander 79. The prism beam expander 79 generates an elliptical output beam 80 for supply as the master pump beam to the master OPO.

Also, the beam splitter 77 generates a beam along path 81 through prism beam expander 82 which generates an elliptical pump beam along path 83 to the power OPO.

The elliptical pump beams generate a pumped volume within the gain material, so that the optical path of the resonant beam within the OPOs remains within the pumped volume of the gain material throughout the tuning range of the crystal.

Harmonics of the Nd:YAG laser system other than the third harmonic, such as the fourth harmonic at 266 nanometers may be used as well as suits the needs of a particular design. Other pump sources, such as Nd:YLF laser systems with harmonic generators, or other visible or UV pulsed sources may be used. The pump source generates a single mode harmonic with less than 0.02 cm$^{-1}$ line width in order to produce a master OPO line width of less than 1.0 cm$^{-1}$.

Other materials which may be used for the gain media of the OPOs include lithium tri-borate (LBO), cesium borate (CBO), potassium titanylphosphate (KTP), or another non-centrosymmetric crystal having a nonlinear polarizability, wide optical transmission, and a large non-linear coefficient.

Figure 5:
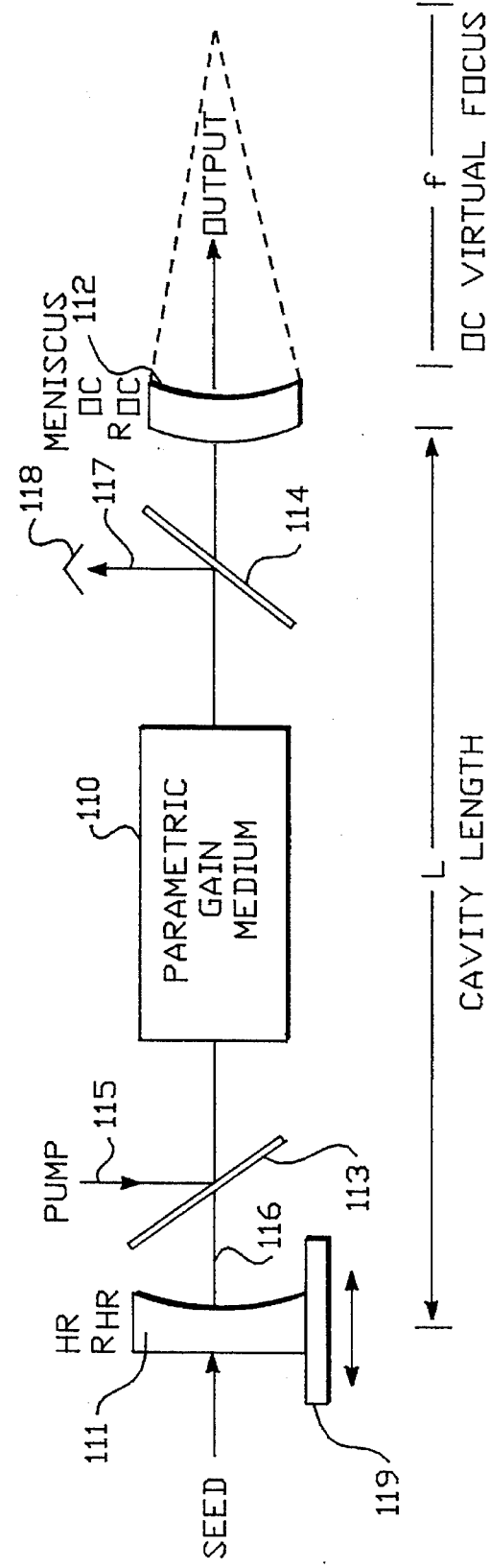
FIGS. 5–7 illustrate alternative designs of a power OPO comprising an unstable resonator.
Figure 6:
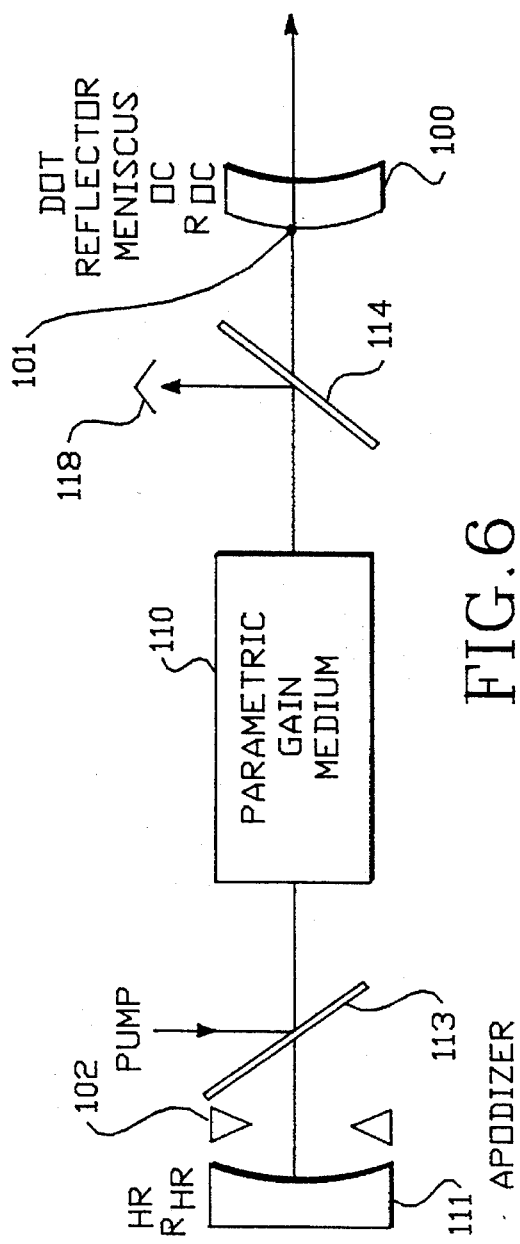
Figure 7:
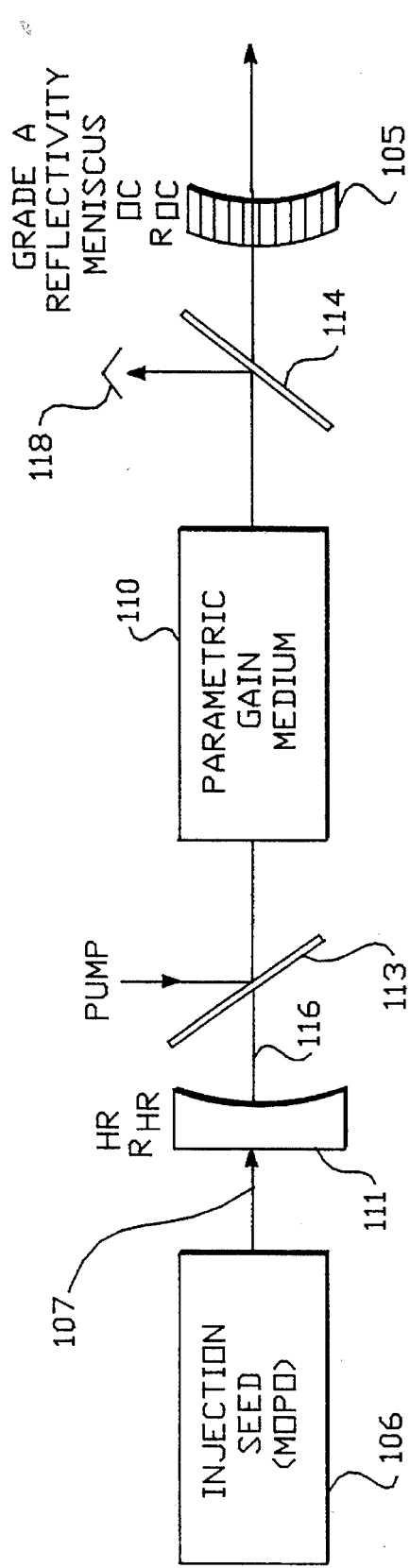

With reference to FIG. 5, the parameters of design of an OPO with a confocal, positive branch unstable resonator according to the present invention is provided. FIGS. 6 and 7 provide alternative unstable resonator designs.

As can be seen in FIG. 5, the power QPO includes an optical parametric gain medium 110 mounted within an unstable resonator. The unstable resonator is defined by a high reflector 111 having a plano outside surface and a concave inside surface with a radius of curvature $R_{HR}$. In addition, an output coupler 112 is included with a convex reflecting surface facing the high reflector 111 having a radius of curvature $R_{OC}$. The output coupler 112 in the preferred system is a meniscus type output coupler with a concave outside surface having a radius of curvature substantially equal to the radius of curvature $R_{OC}$. The output coupler may have a slight wedge to prevent parasitic oscillations. Alternatively, a concave/plano output coupler with an anti-reflective coating on the plano back surface and a slight wedge may be suitable for some applications.

An input dichroic mirror 113 and an output dichroic mirror 114 are included within the resonant cavity for directing a pump beam through the parametric gain medium 110. Thus, a pump beam is supplied along path 115 into dichroic mirror 113 which is mounted at −45 degrees to the optical path 116 of the resonator. The pump beam 115 then, is directed through the parametric gain medium 110 to dichroic mirror 114 mounted at +45° to the optical path 116 (or alternatively 90° for double pass pumping as in FIG. 3). At dichroic mirror 114, the remaining pump beam is reflected along path 117 out of the resonant cavity to a beam blocking mechanism, schematically shown at 118.

This structure defines a confocal, positive branch unstable resonator having a cavity length L, which in design is minimized for efficiency of gain in the OPO. The short cavity length ensures the greatest number of passes of a given photon through the gain medium during a pumping interval, and therefore maximum gain.

As illustrated in FIG. 5, the high reflector 111 is mounted on an adjustable base 119 so that fine adjustments of the cavity length L can be made.

Excellent beam divergence control in the OPO power oscillator shown in FIG. 5 has been achieved with a convex/concave output coupler 112, a plano/concave high reflecting mirror 111 with curvatures and spacing such as the cavity magnification M is greater than 1.0. Good collimation of the signal and idler output beams of the OPO are achieved if the curvature and spacing of the high reflector 111 are set such that its focal point is approximately coincident with the virtual focus of the output coupler. As can be seen in FIG. 5, the output coupler virtual focus "f" will occur at a location approximately $R_{OC}/2$ from the output coupler 112. Thus, cavity parameters can be calculated as follows:

$$R_{HR}/2 \approx L + f$$
$$\approx L + R_{OC}/2;$$
or
$$R_{HR} \approx R_{OC} + 2L$$

With the cavity length L minimized to maximize OPO efficiency, the positive branch, confocal, unstable resonator can be designed. Thus for instance, with a high reflector 111 having a radius $R_{HR}$ of 1.0 meters, and the cavity length of approximately 0.17 meters, an output coupler 112 having a radius of approximately 0.7 meters was found to work very well. In one commercial system, the cavity length of 0.17 meters, with a high reflector having radius $R_{HR}$ of 1.0 meters and an output coupler with radius $R_{OC}$ as 0.75 meters has been chosen.

The calculations set forth above are approximations because the optical length of the cavity depends upon the materials in the OPO, in the reflectors and in other components of the cavity. Thus, fine adjustment of a particular implementation may be required for optimum performance. Also, practical consideration in layout of the resonator will effect the ability to precisely lay out the resonator according to the equation set out above.

The parametric gain medium 110 according to the preferred embodiment comprises beta-barium borate (β-BBO) which has an operable range from below 400 nanometers to greater than 2,000 nanometers. Other high gain OPO material such as described above may be utilized. Furthermore, the gain medium 110 (schematically illustrated in the Figures) includes such mechanisms as necessary for tuning the gain medium by tilting and rotating the same as known in the art.

An experimental setup of a system according to FIG. 5 includes an OPO implemented as follows. The OPO is pumped with the third harmonic of an Nd:YAG laser system, such as the GCR-4(10) injection seeded Nd:YAG laser system available from Spectra-Physics Lasers, Inc., of Mountain View, California.

In the OPO in the experimental configuration, a high reflector 60 was used which was formed with a plano/concave high reflector having a reflecting coating optimized from 510 to 570 nanometers with a radius $R_{HR}$ of 1 meter. The output coupler was formed with a convex/concave meniscus output coupler with a 25% reflectivity at 1.064 microns and a similar reflectivity in the visible range, and with an anti-reflective coating on the back concave surface. The gain medium was beta-barium borate (β-BBO). The pump power with the third harmonic of the Nd:YAG at approximately 355 nanometers ranged from 15 to 800 millijoules per pulse. Relatively large aperture optics are used for generating an output beam with a diameter in the range of 7 to 8 millimeters, to support high pump powers with energy densities low enough to prevent damage on the optics.

A KG-3 (IR blocking) filter was inserted into the cavity to test the system. The filter did not extinguish oscillation and did not change the spatial mode distributions. This means that the OPO of the present invention obtains a low divergence beam from the unstable resonator, oscillating in the signal wavelength only. Thus, with the gain medium tuned to a signal of 532 nanometers and an idler of 1,064 nanometers, an output signal beam of 75 millijoules per pulse and an idler beam of 25 millijoules per pulse was achieved with a pump beam of approximately 400 millijoules per pulse.

Also, when the wavelength was tuned by altering the crystal angles over the tuning range of the available optics, a low divergence characteristic of the output beam was retained.

A preferred output coupler for the visible range might be designed according to preliminary analysis with a single layer of hafnia or an anti reflective coating optimized for reflectivity as an output coupler at 400 nanometers. Analysis shows that the reflectivity for wavelengths in a range from 400 to 700 nanometers for such an optic will taper to a reduced reflectivity towards the higher wavelengths. However, because of the gain profile in the beta-barium borate optical parametric gain medium increases as the wavelength goes from 400 to 700 nanometers, such an optic would appear highly satisfactory for tunable system over such wavelength range.

FIGS. 6 and 7 illustrate alternative resonator designs for use of the present invention. The reference numbers used in FIGS. 6 and 7 are the same as those used in FIG. 5 for like components. Thus, only the differences are described in the text.

The embodiment of FIG. 6 alters the design of the resonator by the use of a dot reflector meniscus output coupler 100. The dot reflector has a central region 101 of relatively high reflectivity over the range of interest. This improves the gain of the resonator. A highly collimated output beam can be achieved; however, a "hole" in the center of the beam is created.

In addition, the resonator may be supplemented with an apodizing element shown schematically by the symbol 102. The apodizing element may consist of an aperture within the resonate cavity, or coating on the optics, such as a highly reflective region around the outside edge of the output coupler 100. The apodizing element can be used to control the outside diameter of the output beam for such applications which require a smaller beam. Alternatively, the outside diameter is controlled by the effective aperture of the parametric gain medium 110, or other optics in the cavity.

FIG. 7 illustrates yet another alternative embodiment. In the embodiment of FIG. 7, the output coupler is replaced with a graded reflectivity meniscus output coupler 105 with a radially varying reflectivity profile. In the preferred system, the graded reflectivity output coupler has a gaussian or super-gaussian profile, to achieve high quality output in a highly collimated beam. See, for instance, co-pending U.S. patent application by Herbst, entitled MULTI-LAYER GRADED REFLECTIVITY MIRROR, METHOD AND APPARATUS FOR MANUFACTURE OF THE SAME, AND LASER RESONATOR USING SAME, Ser. No. 07/824,715, filed Jan. 17, 1992, which is owned now, and was owned at the time of invention by the same Assignee as the present application.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A tunable laser system, comprising:

a master optical parametric oscillator to generate a seed beam including means for limiting line width of the seed beam so that line width of the output beam is less than about 0.5 $cm^{-1}$ over a tunable range of the master optical parametric oscillator;

an unstable resonator including a high reflector and an output coupler set such that a focal point of the high reflector is about coincident with a virtual focus of the output coupler, coupled with the master optical parametric oscillator and injection seeded by the seed beam to generate an output beam;

a laser source supplying an essentially single longitudinal mode pump beam to the master optical parametric oscillator and unstable resonator to allow a generation of narrow band idler wavelengths similar to a generation of narrow band signal wavelengths; and tuning means, coupled to the master optical parametric oscillator and the unstable resonator, for cooperatively tuning the master optical parametric oscillator and the unstable resonator to select a wavelength of the output beam.

2. The laser system of claim 1, wherein the means for limiting line width comprises a diffraction grating.

3. The laser system of claim 2, wherein the diffraction grating is optimized for tuning in the visible range.

4. The laser system of claim 3, wherein the means for limiting line width of the seed beam limits the line width of the output beam to less than about 0.2 $cm^{-1}$.

5. The laser system of claim 4, wherein the means for limiting line width of the seed beam limits line width of the output beam to less than about 0.05 $cm^{-1}$.

6. The laser system of claim 1, wherein the means for limiting line width of the seed beam causes the output beam to consist of essentially a single longitudinal mode.

7. The laser system of claim 1, wherein the means for limiting line width of the seed beam includes a tunable grating, operatively coupled with the tuning means, for limiting line width of the seed beam so that line width of the output beam is less than about 0.5 $cm^{-1}$.

8. The laser system of claim 1, wherein the master optical parametric oscillator and the unstable resonator include respective gain media comprising β-barium borate.

9. The laser system of claim 1, wherein the tuning means comprises tuning elements operable to select the wavelength of the output beam in a range from less than about 500 nanometers to more than about 1500 nanometers.

10. The laser system of claim 1, wherein the tuning means comprises tuning elements operable to select the wavelength of the output beam in a range from about 400 nanometers to about 2000 nanometers.

11. The laser system of claim 1, wherein the laser source comprises:

an injection seeded Nd:YAG laser system.

12. The laser system of claim 11, wherein the injection seeded, Nd:YAG laser system includes a harmonic generator to generate a line narrowed pump beam.

13. The laser system of claim 12, wherein the pump beam has a wavelength of about 335 nanometers.

14. The laser system of claim 12, wherein the pump beam has a wavelength of about 266 nanometers.

15. The laser system of claim 1, wherein the unstable resonator comprises an unstable resonator.

16. The laser system of claim 1, wherein the unstable resonator comprises a positive branch, confocal unstable resonator.

17. A tunable laser system, comprising:

a master optical parametric oscillator to generate a seed beam with a tunable wavelength, including an angle tunable gain medium mount to tune the wavelength of the seed beam through a range of about 400 to 700 nanometers, a gain medium comprising β-barium borate on the tunable mount, and means for limiting line width of the seed beam through the tunable range;

an unstable resonator including a high reflector and an output coupler set such that a focal point of the high reflector is about coincident with a virtual focus of the output coupler, coupled with the master optical parametric oscillator and injection seeded by the seed beam to generate an output beam with transverse mode selectivity and controlled output beam divergence, including an angle tunable gain medium mount and a gain medium comprising β-barium borate on the tunable mount;

an injection seeded, Nd:YAG laser supplying line narrowed pump beams to the master optical parametric oscillator and unstable resonator to allow a generation of narrow band idler wavelengths similar to a generation of narrow band signal wavelengths; and tuning means, coupled to the tunable gain medium mounts in the master optical parametric oscillator and the unstable resonator, for cooperatively tuning the master optical parametric oscillator and the unstable resonator to select a wavelength of the output beam.

18. The laser system of claim 17, wherein the means for limiting line width comprises a wavelength selective element limiting line width of the seed beam so that line width of the output beam is less than about 0.5 $cm^{-1}$.

19. The laser system of claim 17, wherein the means for limiting line width comprises a wavelength selective element limiting line width of the seed beam so that line width of the output beam is less than about 0.2 $cm^{-1}$.

20. The laser system of claim 17, wherein the means for limiting line width comprises a wavelength selective element limiting line width of the seed beam so that line width of the output beam is less than about 0.05 $cm^{-1}$.

21. The laser system of claim 17, wherein the optical means for limiting line width includes a wavelength selective element limiting the line width of the seed beam so that the output beam consists of essentially a single longitudinal mode.

22. The laser system of claim 17, wherein the means for limiting line width includes a tunable grating, operatively coupled with the tuning means, for limiting line width of the seed beam so that line width of the output beam is less than about 0.5 $cm^{-1}$.

23. The laser system of claim 17, wherein the angle tunable gain medium mounts in the master optical parametric oscillator and unstable resonator and the tunable means for limiting line width are operable to select the wavelength of the output beam in a range from about 400 nanometers to more than about 1500 nanometers.

24. The laser system of claim 17, wherein the angle tunable gain medium mounts in the master optical parametric oscillator and unstable resonator and the tunable means for limiting line width are operable to select the wavelength of the output beam in a range from about 400 nanometers to about 2500 nanometers.

25. The laser system of claim 17, wherein the Nd:YAG laser includes a harmonic generator to generate the pump beams.

26. The laser system of claim 25, wherein the pump beams have a wavelength of about 335 nanometers.

27. The laser system of claim 25, wherein the pump beams have a wavelength of about 266 nanometers.

28. The laser system of claim 17, wherein the unstable resonator comprises a confocal unstable resonator.

29. The laser system of claim 17, wherein the unstable resonator comprises a positive branch, confocal unstable resonator.

30. A tunable laser system, comprising:

a master optical parametric oscillator to generate a seed beam having a tunable range of wavelengths of about 400 to 700 nanometers, including an angle tunable gain medium mount and gain medium comprising β-barium borate on the tunable mount;

an unstable resonator including a high reflector and an output coupler set such that a focal point of the high reflector is about coincident with a virtual focus of the output coupler, coupled with the master optical parametric oscillator and injection seeded by the seed beam to generate an output beam with transverse mode selectivity and controlled output beam divergence, including an angle tunable gain medium mount and a gain medium comprising β-barium borate on the tunable mount;

means, mounted with the master optical parametric oscillator, for limiting line width of the seed beam so that line width of the output beam is less than about 0.5 $cm^{-1}$ over the tunable range;

means for supplying line-narrowed pulses of pump energy having a wavelength of about 355 nanometers to the master optical parametric oscillator and unstable resonator to allow a generation of narrow band idler wavelengths similar to a generation of narrow band signal wavelengths; and tuning means, coupled to the tunable gain medium mounts in the master optical parametric oscillator and the unstable resonator and to the means for limiting line width, for cooperatively tuning the master optical parametric oscillator and the unstable resonator to select a wavelength of the output beam in at least a range from about 400 nanometers to about 2000 nanometers.

31. The laser system of claim 30, wherein the means for limiting line width includes a diffraction grating, operatively coupled with the tuning means.

32. The laser system of claim 30, wherein the means for limiting line width comprises a wavelength selective element limiting line width of the seed beam so that line width of the output beam is less than about 0.2 $cm^{-1}$.

33. The laser system of claim 30, wherein the means for limiting line width comprises a wavelength selective element limiting line width of the seed beam so that line width of the output beam is less than about 0.05 $cm^{-1}$.

34. The laser system of claim 30, wherein the means for limiting line width comprises a wavelength selective element limiting the line width of the seed beam so that the output beam consists of essentially a single longitudinal mode.

35. The laser system of claim 30, wherein the angle tunable gain medium mounts in the master optical parametric oscillator and unstable resonator and the means for limiting line width are operable to select the wavelength of the output beam in a range from about 400 nanometers to about 2000 nanometers.

36. The laser system of claim 30, wherein the means for supplying line narrowed pump energy comprises a laser oscillator having Nd:YAG gain medium and a harmonic generator to generate a pump beam.

37. The laser system of claim 30, wherein the unstable resonator comprises a confocal unstable resonator.

38. The laser system of claim 30, wherein the unstable resonator comprises a positive branch, confocal unstable resonator.

* * * * *